United States Patent [19]

Couch et al.

[11] 4,031,605

[45] June 28, 1977

[54] METHOD OF FABRICATING COMBUSTION CHAMBER LINERS

[75] Inventors: Harold Thompson Couch, Columbia; Leonard Selwyn Cohen, West Hartford; Lawrence Joseph Coulter, South Windsor, all of Conn.

[73] Assignee: The United States of America as represented by the Secretary of the Navy, Washington, D.C.

[22] Filed: Aug. 5, 1976

[21] Appl. No.: 712,128

[52] U.S. Cl. .................................. 29/460; 264/101; 264/254; 264/269; 264/274; 264/296; 264/311; 264/328

[51] Int. Cl.[2] ........................ B29C 5/04; B29D 3/02

[58] Field of Search .......... 264/259, 267, 269, 270, 264/271, 273, 310, 311, 328, 274, 296, 254, 261–263, 268–220, 333, 297, 101, 102; 431/157, 158, 350; 123/191 A, 191 R, 191 SP; 29/527.2, 527.3; 102/105; 60/200 A, 200 B; 156/91, 242, 245

[56] References Cited

UNITED STATES PATENTS

| | | | |
|---|---|---|---|
| 2,395,731 | 2/1946 | Ford | 264/268 |
| 2,995,011 | 8/1961 | Kimmel | 60/200 A |
| 3,460,759 | 8/1969 | Gregory et al. | 60/200 A |
| 3,780,151 | 12/1973 | Heier | 264/102 |
| 3,790,650 | 2/1974 | Heier | 264/102 |

*Primary Examiner*—Willard E. Hoag
*Attorney, Agent, or Firm*—R. S. Sciascia; Roy Miller; David J. Aston

[57] ABSTRACT

A fluid polymeric ablator liner is cast onto the inner surface of a ramjet combustion chamber which has been prepared with a screen liner substrate. A split mold is inserted through the nozzle and assembled inside the chamber allowing a thin layer of ablator to be cast and cured on the dome and nozzle regions of the combustion chamber.

5 Claims, 3 Drawing Figures

METHOD OF FABRICATING COMBUSTION CHAMBER LINERS

BACKGROUND OF THE INVENTION

In the present invention a fluid polymer is cast as a lining on the interior surface of a closed chamber with a nozzle opening, such as a combustion chamber of a ramjet engine or a rocket motor.

The use of various liners between a solid propellant and its external casing is well known to those skilled in propulsion technology. Liners provide improved mechanical bonding of the solid propellant grain to the metal casing and improved thermal insulation between the grain and casing.

Ablative polymeric materials have been known in aerospace technology for many years, and are commonly used to provide such thermal insulation. A class of ablative polymeric material has been termed "motor case insulation," such as boric acid powder-filled polybutadiene-acrylonitrile, and phenolic resins in chopped carbon fabric, or with a variety of fillers such as glass, silica and asbestos. Other known ablative materials are Teflon, reg. tr., epoxy-novolac, and silicone elastomer.

A good discussion of the use of ablative liners in combustion chambers may be found in "Ablative Polymers in Aerospace Technology" by Donald L. Schmidt in *Ablative Plastics*, G. F. D'Alelio and John A. Parker, eds. (Marcel Dekker Inc. 1971). Elastomeric ablative insulation for combustion chamber is commonly milled into sheets, bonded together and then vulcanized in place. The many bonded joints that result from this process increase potential liner failure. The chamber may also be tape wrapped with a resin-impregnated woven fibrous tape. The tape is commonly laid in cylindrical and conical sections with the aid of large lathes to compact the tape, which is then heat cured and compression molded.

The recent development of relatively fluid, elastomeric-based ablator formulations has made possible the development of casting techniques to replace the fabrication techniques necessary with conventional polymeric material produced as powder or granules.

The advantages of molding a flowable polymer into a liner have been appreciated in the past. For instance, Woodruff et al. disclose, in U.S. Pat. No. 2,971,225, a method of assembling a mold inside a metal article and injecting a plastic between the mold and the article. Prior art methods would not be suitable for use in a combustion chamber, however, due to the number of external mountings for the mold which are allowed by the relative accessability of the interior of the articles generally coated. The interior of a combustion chamber presents something of a "ship in a bottle" problem, the nozzle being the bottle neck.

SUMMARY OF THE INVENTION

A fluid polymeric liner is cast onto the inner surface of a combustion chamber through the use of a split mold assembly which is inserted through the nozzle and assembled inside the chamber. The domed end and the nozzle end opposite are then paralleled by the surfaces of the mold. Since the cylindrical portion of the combustion chamber may be coated through centrifugal force, the dome and nozzle section are cast separately through their respective mold fixtures and are held in place at the outer edge of the nozzle, at the sealing edge of the dome mold, and by a rigid connection between the nozzle and dome mold sections. The inner surface of the combustion chamber is prepared by lining it with a wire screen substrate. The mold is assembled, and the fluid, preferably ablative, material is injected into the mold cavities defined by the fixtures through tubes leading in through the nozzle and through the mold fixtures while the cavities are being evacuated to avoid trapped air. A special injection apparatus also ensures a void free lining. The lining may then be cured by introduction of steam into the mold fixtures.

DESCRIPTION OF THE PREFERRED EMBODIMENT

Liner Fabrication Procedure

In the instance where a ramjet combustor is to be insulated with ablator material, the dome and nozzle regions are lined first. After lining the dome and nozzle regions, the mold fixture is removed and a (cylindrical) liner is spin cured in the cylindrical case region. Prior to mold assembly the dome and nozzle regions of a ramjet combustor are covered with a single thickness of 0.250 inch mesh × 0.040 inch wire diameter type No. 316 stainless screen which is spot welded at approximately two inch intervals onto the ramjet combustor walls. After installation of the substrate screen, the nozzle and dome regions of the combustor are vapor degreased with trichlorethylene, rinsed with acetone, and sprayed with an adhesive primer. Adhesive primers marketed as Dow Corning 1200 and General Electric SS4155 have been found to be satisfactory. The adhesive primer materials assist in the bonding of the ablator to the combustor walls and the wire substrate. The inside surfaces of the mold fixture which contact the ablator are sprayed with a polytetrafluoroethylene base mold release agent.

Dome Fixture Assembly

Figure 1:
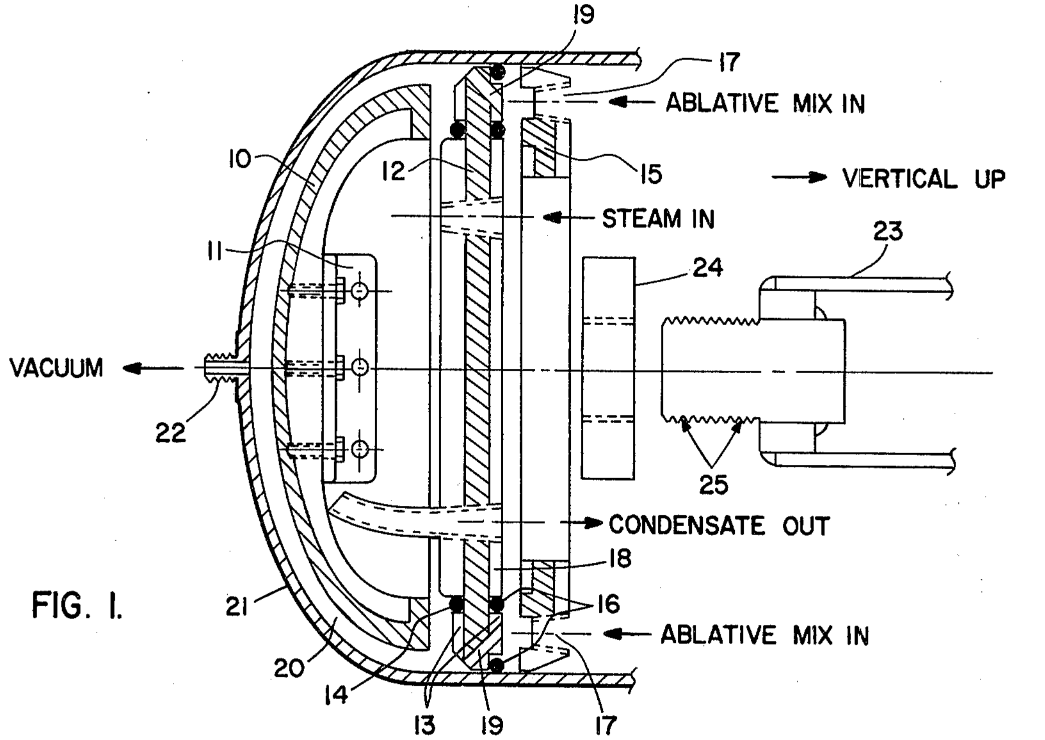
FIG. 1 is an exploded sectional view of a dome section mold fixture.

After substrate preparation the dome section of the fixture is assembled within the combustor; subsequently, the nozzle section of the fixture is installed. Referring now to FIG. 1, all of the large diameter parts there shown which constitute the fixture are split to enable insertion through the ramjet nozzle. The split halves are sealed with gasket material fabricated from 1/32 in. neoprene sheet. Not shown in the figure are the bolt circles for assembling the component parts. The elipsoidal dome mold sections 10 are first bolted together through the angle pieces 11. Then the dome steam cover plate 12 is assembled. This assembly task can be accomplished in a straight forward manner since the split between halves is at an angle of 60° from the disk axis and bolts through the gaskets 13 tie the halves together. Correct positioning of the cover plate 12 halves during assembly is ensured by the engagement of two dowel pins, not shown. The "O" ring 14 facing the dome mold section, is installed next and the two assembled pieces are bolted together.

The dome injector feed ring 15 is assembled in the same manner and is fastened to the dome steam cover plate with a second bolt circle after the second set of "O" rings 16 is positioned on the backside of the dome steam cover plate 12. The split between halves of the dome injector feed ring is oriented at 60° from both the dome steam cover plate 12 split and the split between dome mold section 10 halves.

Figure 3:
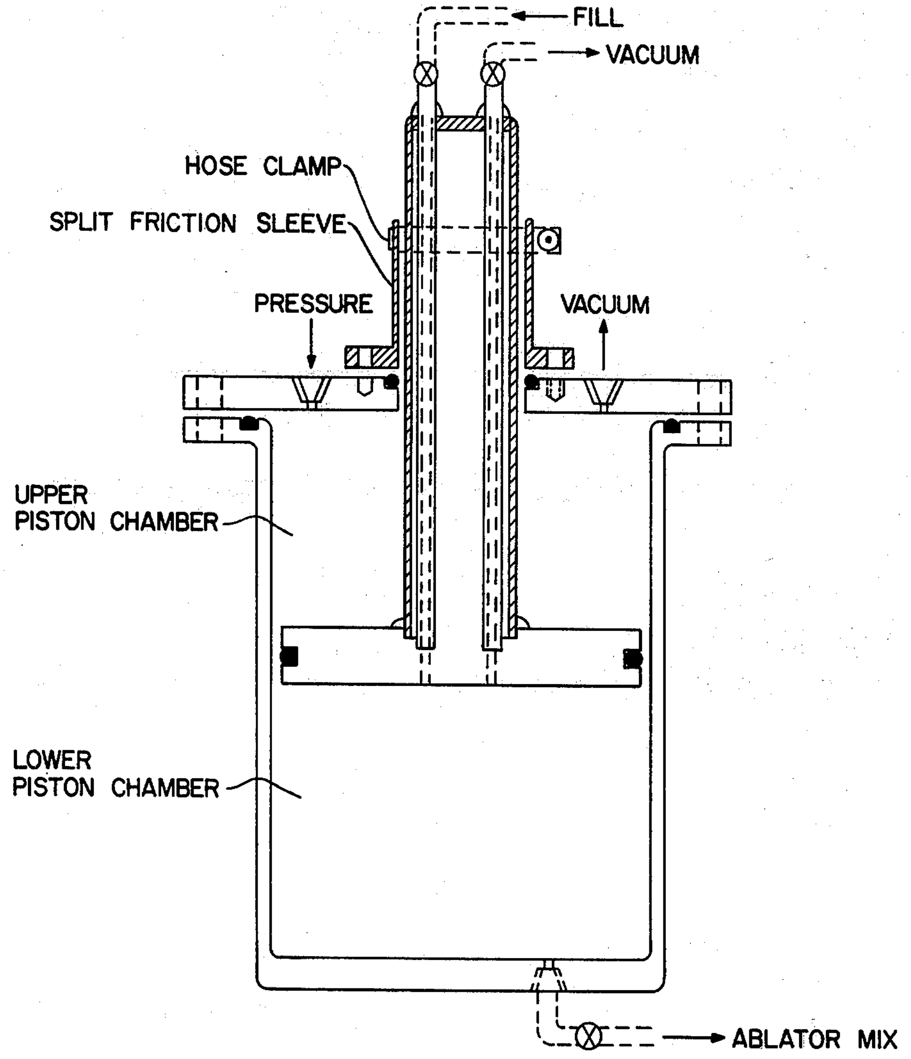
FIG. 3 is a schematic drawing of a pressurized injector.

Shown in FIG. 1 are two possible feed ports 17 for the ablator mix. Typically, one of these is plugged when using the relatively fluid elastomeric based ablator formulations. During liner fabrication the injected ablator liquid flows around the feed channel 18 formed between the dome steam cover plate 12 and the dome injector feed ring 15. Also shown in FIG. 3 are two of sixteen holes 19 oriented at 45° through the dome steam cover plate 12 connecting the dome cavity 20 formed between the dome mold and the feed channel 18. Typically the dome cavity 20 formed between the dome mold section 10 and the ramjet combustor 21 is evacuated through the dome port 22 prior to and during filling. This line is closed when ablator overflow first appears through the dome port 22 to minimize entrained voids in the finished liner.

Prior to lining the combustor, the dome mold assembly must be accurately positioned in the combustor and secured in place. This is accomplished through lateral movement of the hollow connecting shaft 23. This shaft threads into the rectangular hub 24, which in turn bolts to the dome steam cover plate 12. The connecting shaft 23 is aligned and moved fore and aft by threaded connections 25 associated with the nozzle fixture section to the described below.

Nozzle Fixture Assembly

Metal wall preparation including the installation of the screen liner in the nozzle region is identical with that described for the dome region. It should be noted, however, that the case region cannot be prepared until after complete fabrication of the dome and nozzle liners. This is because the presence of screen liner in the case region would interfere with assembling the component parts of the mold fixture.

Figure 2:
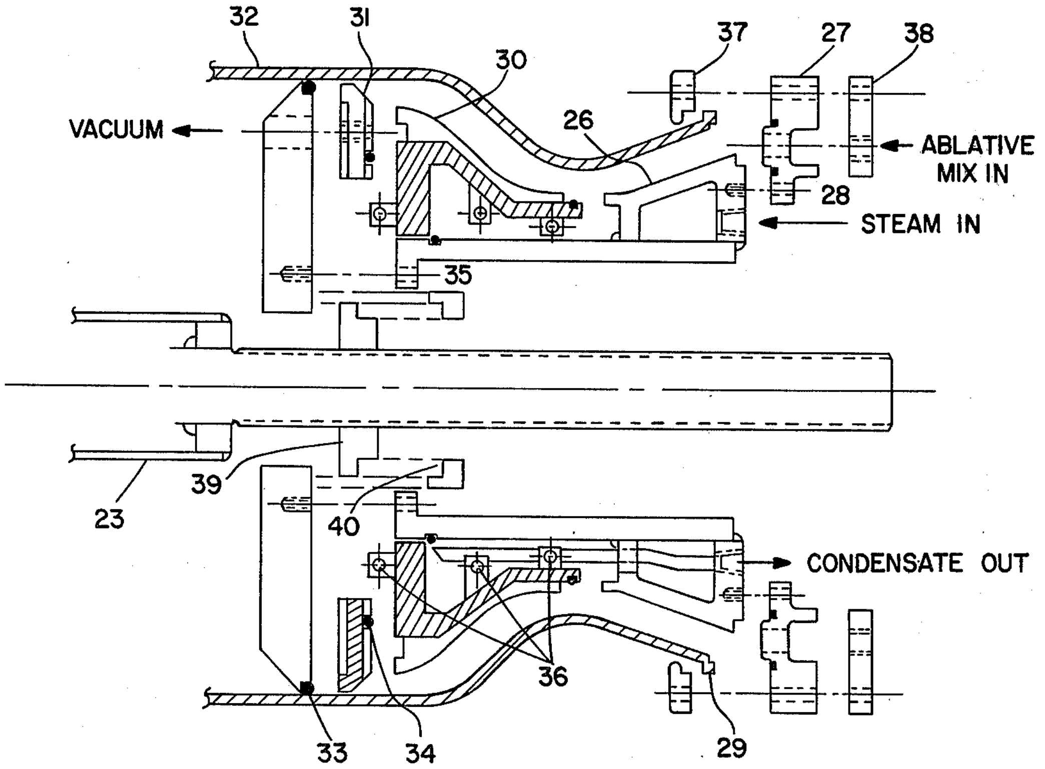
FIG. 2 is an exploded sectional view of a nozzle section mold fixture.

Referring now to FIG. 2, assembly of the nozzle section of the mold fixture begins with the integration of the aft nozzle mold section 26, and the nozzle injector feed ring 27. These parts, which are connected through bolt circle 28 are separable to accommodate a jack which mates with the ramjet nozzle exit flange 29. This jack is used during fixture disassembly to extract the dome section once the ablative liner has been fabricated.

The three split pieces shown in FIG. 2 are the forward nozzle mold section 30, the forward nozzle closure ring 31, and the nozzle fixture restraining disk 32. These parts must be assembled inside the combustor from the split halves. The nozzle fixture restraining disk 32 must be assembled in the orientation shown prior to placement of the "O" ring seal 33. The split is at a 60° angle relative to the combustor axis, and the halves are positioned with dowel pins and bolted together with the pins and bolts oriented along the split between halves, with axis parallel to the combustor axis. The forward nozzle closure ring 31, is assembled next from the halves, where one half has been previously fitted with interface gaskets cut from 1/32 inch neoprene sheet. As with the nozzle fixture restraining disk 32, the split between halves is at a 60° angle relative to the combustor axis. The "O" ring 33 confined between the nozzle fixture restraining disk 32 and the forward nozzle closure ring 31 and the forward nozzle mold section 30 are sealed against atmospheric pressure by thrust from the nozzle fixture restraining disk 32 which bolts directly to the aft nozzle mold section 26 through hole 35. Before inserting the aft nozzle mold section 26, however, the forward nozzle mold section halves 30 are joined inside the combustor by flange bolts 36 after facing the mating surfaces with 1/32 in. neoprene sheet. Finally, the entire nozzle fixture assembly is clamped in place by 16 bolts through; (a) the nozzle fixture clamp ring 37 (actually a split ring), (b) the nozzle injector feed ring 27 and (c) the nozzle feed closure ring 38.

After assembly and installation of the nozzle fixture section, the previously assembled dome fixture assembly must be aligned and positioned so that the desired liner thickness will be obtained in the dome region. This is accomplished by the threaded dome alignment ring 39, and the alignment ring clamp assembly 40 shown surrounding the hollow connecting shaft 23. The clamp assures alignment of the dome section and prevents downstream displacement of the dome fixture section under molding pressure loads.

Dome and Nozzle Liner Ablator Injection Procedure

The silicone elastomer ablator formulation used in this process is a viscous liquid prior to cure. Dow Corning Aerospace Ablator Material No. 93–104 was found suitable. Other silicone elastomer materials are available commercially, such as Dow Corning Sygard 184 and E691–22E and General Electric RTV 560. Epoxies, phenolics and polybenzimidazoles may be substituted. Any polymer which is fluid in the uncured state may be used with the present invention. This material is injected into the dome and nozzle mold cavities shown in FIGS. 1 and 2. Prior to and during injection the mold cavities are evacuated. The downstream vacuum line is closed when the mold cavities are filled, as evidenced by observation of ablator overflow, and a slight pressure (greater than atmospheric) is sustained on the ablator fill line at least until the first stages of the cure reaction have been completed. Besides these expedients, which ensure against the inclusion of voids from air leaking into regions below atmospheric pressure, it is essential to achieve total deaeration of the catalyzed ablator mix prior to injection. This may be accomplished with the injector shown schematically in FIG. 3.

The six-quart injector is driven by a high pressure fluid (up to 500 psi) acting on the upper piston surface. The piston is initially withdrawn by evacuating the upper piston chamber and clamped in place by the split sleeve, before the injector is filled. During the fill operation the lower piston chamber is continuously evacuated through one of the lines routed through the piston shaft while the catalyzed, mixed elastomeric-based ablator is drawn into the injector through the other line contained within the piston shaft. During the filling process a filament of the viscous ablator is formed and falls through a vacuum environment which facilitates removal of virtually all entrained or dissolved air. After complete filling with simultaneous deaeration, the fill line is closed and the piston is released so that atmospheric pressure causes it to fall against the ablator mix. When the piston comes to rest, indicating confinement of the ablator charge, the lower piston chamber vacuum line is closed and the upper piston chamber is pressurized to produce the desired injector pressure at the lower chamber exit. The combination of pressure and valve setting controls ablator flow rate during fill of the dome and nozzle mold cavities.

Dome and Nozzle Liner Cure

Immediately after the dome and nozzle section mold cavities have been filled with injected ablator the cure procedure is initiated. When ablator liquid overflow is observed valves on the vacuum lines are closed and steam heat is introduced to accelerate the cure. To prevent ablator contamination from leaks either from the atmosphere or from the steam cavity, injector pressure is sustained at a value greater than atmosphere during the first phase of the cure cycle.

The elastomeric ablator used sets up (jells) during the first phase of the steam cycle where the fixture is heated by 10 psia saturated steam (190° F) for one hour. To obtain better properties the cure is continued where the steam pressure is next raised in stages to 25 psia (240° F) for two hours and 50 psia (280° F) for two more hours. A final post-cure is conducted with 115 psia steam (340° F) for four hours. After cooling the mold fixture is disassembled and removed, and the combustor is ready for installation of the case liner using a conventional spin-curing technique.

Spin Cured Case Liner Fabrication Procedure

The "case" region of the combustor is prepared for lining in exactly the same manner as the dome and nozzle regions with regard to the installations of screen liner, the cleaning procedure, and the application of adhesive primer. After this preparation, the inlet ports are sealed, and a measured quantity of ablator is troweled onto the case while the ramjet combustor is spun about its major axis. Typically, the rate of rotation is such that the centrifugal load is about 10 gravities, which is sufficient to cause uniform distribution of the ablator material about the case region between the dome and nozzle liner section. The ablator cures while the combustor continues to rotate, and it is important that the combustor axis be oriented horizontally during this operation. After about 12–24 hours at room temperature the ablator will have jelled and the combustor can be removed and placed in an oven for post-curing the case liner section.

The quality of the ablative liner in the nozzle and dome regions is generally superior to the quality of the liner in the case region because a controlled temperature cycle can be used during the cure procedure. The liner thickness in both the nozzle and dome regions was controlled to within 0.020 in. of the design thickness of 0.25 in. and the liner in both regions was void free and uniformly bonded to the combustor walls. The thickness of the spin cured liner in the case region was within 0.040 inch of the design thickness of 0.25 inch also void free, and uniformly bonded to the combustor walls.

What is claimed is:

1. In a combustion chamber having a nozzle, an inner surface, an outer surface, and at least one domed region, a method of fabricating a liner on the inner surface of said combustion chamber comprising the steps of:

a. first attaching a wire mesh substrate screen to said inner surface of said combustion chamber so as to cover at least the domed region and the nozzle;
b. forming a cavity between said domed region and a parallel domed surface of a mold fixture assembled inside said combustion chamber;
c. forming a cavity between said nozzle and a mold fixture assembled inside said nozzle to form a surface parallel to said nozzle;
d. injecting a fluid curable polymeric material into said cavity between said domed surface and said domed region and into said cavity between said nozzle and said surface parallel to said nozzle; and
e. curing said fluid polymeric material into a firm solid affixed to said substrate screen.

2. The process of claim 1 further comprising the step of applying the fluid curable polymeric material to a cylindrical portion of said inner surface while said cylindrical portion is spinning about its major axis.

3. The process of claim 1 wherein said curing is facilitated by injecting steam into said mold fixtures of step (b) and of step (c) of claim 1 whereby said fluid polymeric material is heated during curing.

4. The process of claim 3 wherein the injecting of said fluid polymeric material is accompanied by evacuating the cavities into which said fluid is injected.

5. The process of claim 4 wherein said fluid polymeric material is a silicone based elastomeric ablator material.

* * * * *